(12) United States Patent
Khosla et al.

(10) Patent No.: US 8,774,517 B1
(45) Date of Patent: Jul. 8, 2014

(54) SYSTEM FOR IDENTIFYING REGIONS OF INTEREST IN VISUAL IMAGERY

(75) Inventors: Deepak Khosla, Camarillo, CA (US); Rajan Bhattacharyya, Sherman Oaks, CA (US); Terrell N. Mundhenk, Los Angeles, CA (US); David J. Huber, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 860 days.

(21) Appl. No.: 12/982,713

(22) Filed: Dec. 30, 2010

Related U.S. Application Data

(63) Continuation-in-part of application No. 12/214,259, filed on Jun. 16, 2008, now Pat. No. 8,363,939.

(60) Provisional application No. 60/944,042, filed on Jun. 14, 2007.

(51) Int. Cl.
*G06K 9/00* (2006.01)

(52) U.S. Cl.
USPC ........................................ 382/190; 348/231.3

(58) Field of Classification Search
None
See application file for complete search history.

(56) References Cited

U.S. PATENT DOCUMENTS

| | | | |
|---|---|---|---|
| 6,670,963 B2 | 12/2003 | Osberger | |
| 2004/0088726 A1* | 5/2004 | Ma et al. | 725/46 |
| 2004/0165784 A1* | 8/2004 | Xie et al. | 382/254 |
| 2005/0047647 A1 | 3/2005 | Rutishauser et al. | |
| 2007/0173699 A1 | 7/2007 | Mathan et al. | |
| 2007/0236488 A1 | 10/2007 | Mathan et al. | |
| 2008/0056611 A1 | 3/2008 | Mathan et al. | |
| 2009/0245626 A1* | 10/2009 | Norimatsu et al. | 382/164 |
| 2010/0226564 A1* | 9/2010 | Marchesotti et al. | 382/159 |

FOREIGN PATENT DOCUMENTS

| | | |
|---|---|---|
| WO | WO 03/093947 | 11/2003 |

OTHER PUBLICATIONS

Einhauser et al. (Jul. 20, 2007) "A bottom-up model of spatial attention predicts human error patterns in rapid scene recognition." J. Vision, vol. 7 No. 10 Art. 6, pp. 1-13.*

Itti et al. (Jun. 2005) "A principled approach to detecting surprising events in video." Proc. 2005 IEEE CS Conf. on Computer Vision and Pattern Recognition, vol. 1 pp. 631-637.*

Mundhenk et al. (Jul. 2009) "Automatic computation of an image's statistical surprise predicts performance of human observers on a natural imgae detection task." Vision Research, vol. 49 No. 13, pp. 1620-1637.*

Xu et al. (Dec. 2008) "Looking at the surprise: Bottom-up attentional control of an active camera system." Proc. 10th IEEE Int'l Conf. on Control, Automation, Robotics, and Vision, pp. 637-642.*

(Continued)

*Primary Examiner* — Barry Drennan
(74) *Attorney, Agent, or Firm* — Tope-McKay & Associates

(57) ABSTRACT

The present invention relates to a system for identifying regions of interest in visual imagery. The system is configured to receive a series of consecutive frames representing a scene as captured from N sensors. The frames include at least a current frame and a previous frame. A surprise map can be generated based on features found in the current frame and the previous frame. The surprise map having a plurality of values corresponding to spatial locations within the scene. Based on the values, a surprise in the scene can be identified if a value in the surprise map exceeds a predetermined threshold.

39 Claims, 8 Drawing Sheets

(56) References Cited

OTHER PUBLICATIONS

A bio-inspired method and system for visual object-based attention and segmentation David J Huber, Deepak Khosla, Automatic Target Recognition XX: Acquisition, Tracking, Pointing, and Laser Systems Technologies XXIV; Optical Pattern Recognition XXI, Proc. of SPIE vol. 7696, 769613.

Bio-inspired "Surprise" for Real-Time Change Detector in Visual Imagery, David J. Huber, Deepak Khosla, Automatic Target Recognition XXI, Proc. of SPIE vol. 8049 804904-1 (TICR 11-087).

L. Itti, C. Koch, E. Niebur, A Model of Saliency-Based Visual Attention for Rapid Scene Analysis, IEEE Transactions on Pattern Analysis and Machine Intelligence, vol. 20, No. 11, pp. 1254-1259, Nov. 1998.

F. Baluch, L. Itti, Mechanisms of Top-Down Attention, Trends in Neurosciences, vol. 34, pp. 210-224, Mar. 2011.

L. Itti, P. F. Baldi, Bayesian Surprise Attracts Human Attention, In: Advances in Neural Information Processing Systems, vol. 19 (NIPS*2005), pp. 547-554, Cambridge, MA:MIT Press, 2006.

V. Navalpakkam, L. Itti, An Integrated Model of Top-down and Bottom-up Attention for Optimal Object Detection, In: Proc. IEEE Conference on Computer Vision and Pattern Recognition (CVPR), pp. 2049-2056, Jun. 2006.

Learning to predict where humans look, T. Judd, K. Ehinger, F. Durand, and A. Torralba, IEEE International Conference on Computer Vision (ICCV), 2009.

The role of context in object recognition, A. Oliva, A. Torralba, Trends in Cognitive Sciences, vol. 11(12), pp. 520-527. Dec. 2007.

C. Chamaret, O. Le Meur and J.C. Chevet, Spatio-temporal combination of saliency maps and eye-tracking assessment of different strategies, ICIP, pp. 1077-1080, 2010.

O. Le Meur, P. Le Cattet and D. Barba, Predicting visual fixations on video based on low-level visual features, Vision Research, vol. 47/19 pp. 2483-2498, Sep. 2007.

Andoni A., et al., "Near-Optimal Hashing Algorithms for Near Neighbor Problem in High Dimensions," Proceedings of the Symposium on Foundations of Computer Science (FOCS'06), 2006.

Bentin, S., et al., "Electrophysiological studies of face perception in humans," Journal of Cognitive Neuroscience, 8, 551-565, 1996.

Berg A., "Shape matching and object recognition," Ph.D. thesis, UC Berkeley, Computer Science Division, Berkeley, CA, Dec. 2005.

Berka, C., et al., "Evaluation of an EEG-workload model in an aegis simulation environment" in Proceedings of SPIE Defense and Security Symposium, 90-99, 2005.

Bhattacharyya, R., et al., "Optimal image ordering for rapid serial visual presentation using electroencephalography," Presented at Society of NeuroScience (SfN) annual meeting, Chicago, 2009.

Carpenter G.A., et al., "A massively parallel architecture for a self-organizing neural pattern recognition machine," Computer Vision, Graphics, and Image Processing, 37, 54-115, 1987.

Carpenter G.A., et al., "The what-and-where filter a spatial mapping neural network for object recognition and image understanding," Computer Vision and Image Understanding, 69, 1-22, 1998.

Carpenter G.A., "Default ARTMAP," in Proc. of the International Joint Conference on Neural Networks (IJCNN'03), 1396-1401, 2003.

Carpenter G.A., et al., "Self-organizing information fusion and hierarchical knowledge discovery: a new framework using ARTMAP neural networks," Neural Networks, 18, 287-295, 2005.

Cowell, et al., "Construction and validation of neurophysio-technological framework for imagery analysis," in J.Jacke (Ed.): Human-Computer Interaction, Part II, HCII 2007, LNCS 4551, pp. 1096-1105, 2007, © Springer-Verlag Berlin Heidelberg.

Draper B., et al., "Evaluation of Selective Attention under Similarity Transforms," In Workshop on Performance and Attention in Computer Vision. Graz, Austria, Apr. 2003.

Eckhorn R., et al., "Coherent Oscillations: A Mechanism of feature linking in the visual cortex?" Biological Cybernetics 60, 121-130, 1988.

Eimer, M., "Does the face-specific N170 component reflect the activity of a specialized eye processor?" Neuroreport, 9, 2945-2948, 1998.

Fabre-Thorpe, M., et al., "A limit to the speed of processing in Ultra-Rapid visual categorization of novel natural scenes," Journal of Cognitive Neuroscience, 13, 171-180, 2001.

Field D.J., "Relations between the statistics of natural images and the response properties of cortical cells," J. Opt. Soc. Am. A., 4: 2379-2394, 1987.

Fei-Fei L., et al., "Learning generative visual models from few training examples: an incremental Bayesian approach tested on 101 object categories," CVPR 2004, Workshop on Generative-Model Based Vision, 2004.

Gerson, A.D., et al., "Cortically coupled computer vision for rapid image search," IEEE Transactions on Neural Systems and Rehabilitation Engineering, 14(2): 174-179, Jun. 2006.

Gladwell, M., "Blink: the power of thinking without thinking," 1st ed. Little, brown and company: Time Warner Book Group, New York, 2005, pp. 18-47.

Gutin, G., et al., "Traveling salesman should not be greedy: domination of analysis of greedy-type heuristics for the TSP," Discrete Applied Mathematics, 117: 81-86, 2002.

Gray C.M., et al., "Oscillatory Responses in Cat visual cortex exhibit intercolumnar synchronization which reflects global stimulus properties," Nature 338: 334-336, 1989.

Hopf, J.-M., et al., "Localizing visual discrimination processes in time and space," The American Physiological Society, 88, 2088-2095, 2002.

Itti L., et al., "A saliency-based search mechanism for overt and covert shifts of visual attention," Vision Research, 40: 1489-1506, 2000.

Itti L., et al., "A Model of Saliency-Based Visual Attention for Rapid Scene Analysis," IEEE Transactions on Pattern Analysis and Machine Intelligence, 20, 1254-1259, 1998.

Itti L., et al., "Bayesian Surprise Attracts Human Attention," Vision Research 49: 1295-1306, 2008.

Itti, L., et al., "Computational Modeling of Visual Attention," Nature Reviews Neuroscience, 2, 194-203, 2001.

Itti, L., "Quantifying the Contribution of low-level saliency to human eye movements in dynamic scenes," Visual Cognition, 12, 1093-1123, 2005.

Keysers, C., et al., "The Speed of Sight," Journal of Cognitive Neuroscience, 13 (1), 90-101, 2001.

Khosla D., et al., "Bio-Inspired Visual Attention and Object Recognition," In: Proc. SPIE Defense, Security, and Sensing, 6560, 656003, 2007.

Khosla, D., et al., "A bio-inspired system for spatio-temporal recognition in static and video imagery," Proc. SPIE 6560, 656002, 2007.

Koch C., et al., "Shifts in selective visual attention: towards the underlying neural circuitry," Human Neurobiology, 4: 219-227, 1985.

Lazebnik S., et al., "Beyond Bags of Features: spatial pyramid matching for recognizing natural scene categories," In: Proc. IEEE Conference on Computer Vision and Pattern Recognition (CVPR), 2006.

Ling, H., et al., "Diffusion distance for histogram comparison," IEEE Computer Society Conference on Computer Vision and Pattern Recognition (CVPR), 2006.

Medasani, S., et al., "Possibilistic particle swarms for optimization," Proceedings 5673 of SPIE/IST Symposium on Electronic Imaging, 2005.

Medasani, S., et al., "Active learning system for object fingerprinting," International Joint Conference on Neural Networks, 2004.

Morrison, D., et al., "Semantic clustering of images using patterns of relevance feedback," in Proceedings of the 6th International Workshop on Content-based Multimedia Indexing (CBMI 2008), London, UK.

Nane S.A., et al., "Columbia Object Image Library (COIL-100)," Technical Report CUCS-006-96, Feb. 1996.

Navalpakkam V., et al., Modeling the Influence of Task on Attention. Vision Research, 45: 205-231, 2005.

Navalpakkam V., et al., "An integrated model of top-down and bottom-up attention for optimal object detection," In: Proc. IEEE Conference on Computer Vision and Pattern Recognition (CVPR), 1-7, 2006.

(56) References Cited

OTHER PUBLICATIONS

Navalpakkam V., et al., "Sharing resources: buy attention, get recognition," In: Proc. International Workshop on Attention and Performance in Computer Vision (WAPCV'03), Graz, Austria, Jul. 2003.
Navalpakkam, V, et al., "Search goal tunes visual features optimally," Neuron, 53, 605-617, 2007.
Niebur E., at al., "Control of selective visual attention: modeling the 'where' pathway," In D. Touretzky, M Mozer and M. Hasselmo. Neural Imformation Processing Systems (NIPS 8), 802-808, Cambridge, MA, MIT, Press 1996.
Orabona F., et al., "Object-based Visual Attention: A Model for a Behaving Robot," In 3rd International Workshop on Attention and Performance in Computational Vision (in CVPR 2005), San Diego, CA, Jun. 2005.
Owechko, Y., et al., "A swarm-based volition/attention framework for object recognition," IEEE Conference on Computer Vision and Pattern Recognition, San Diego, 2005.
Owechko, Y., et al., "Cognitive swarms for rapid detection of objects and associations in visual imagery," IEEE Swarm Intelligence Symposium, 2005.
Peters, R.J., et al, "Beyond bottom-up: Incorporating task-dependent influences into computational model of spatial attention," in: Proc. IEEE Conference on Computer Vision and Pattern Recognition (CVPR), 2007.
Rogowitz, B.E., et al., "Perceptual image similarity experiments," Proceedings of SPIE, 3299: 576-590, 1998.
Scholl B.J., "Objects and Attention: the state of the art," Cognition 80, 1-46, 2001.
Serre T., et al., "Object recognition with features inspired by visual cortex," in Proceedings of the IEEE conference on computer vision and pattern recognition (CVPR), San Diego, CA, Jun. 2005.
Smeulders, A., et al., "Content-based image retrieval at the end of the early years," IEEE Transactions on PAMI, 22(12): 1349-1380, 2000.
Sun Y., et al., "Hierarchical selectivity for object-based visual attention," Submitted to Artificial Intelligence, 2004.
Sun, Y., et al., "Probabilistic judgment by a coarser scale: behavioral and ERP evidence," in Proceedings of the Twenty-sixth Annual meeting of the Cognitive Science Society, 2004.
Thorpe, S., et al., "Speed of processing in the human visual system," Nature, vol. 381, pp. 520-522, 1996.
University of California, San Diego Complex Systems and Cognition Laboratory, CSCLAB Image Database http://csclab.ucsd.edu/labeledimages.php. 2006.
Walther D., et al, "Attentional selection for object recognition—a gentle way," Lecture Notes in Computer Science 2525: 472-479, 2002.
Wolfe J.M., "Visual Search in continuous, naturalistic stimuli," Vision Research 34: 1187-1195, 1994.
Vazirani, V., "Approximation Algorithms," Springer-Verlag, Berlin, Germany. pp. 32-33 (2004).
Vogel, E.K., et al., "The Visual NI Component as an index of a discrimination process," Psychophysiology, 2000.
Yamaguchi, S., et al., "Cerebral Asymmetry of the 'Top-down' allocation of attention to global and local features," The Journal of Neuroscience, 20, 1-5, 2000.
Zang H., et al., "SVM-KNN: Discriminative nearest neighbor classification for visual category recognition," CVPR 2006.26. Vazirani, V., "Approximation algorithms," Springer-Verlag, Berlin, Germany, p. 32, 2004.
http://en.wikipedia.org/Travelling_salesman_problem.
Richard P. Wildes, "A measure of motion salience for surveillance applications" in Proc. IEEE Int'l Conf. Image Processing, 1998.

* cited by examiner

| Algorithm | Total Storage Cost | Processing Cost |
|---|---|---|
| Continuous (Baseline) Run all cameras in continuous operation (greedy solution; high SWaP) | S + P 230 MegaBytes (MB) | F |
| StoreAll Conserve prior information and previous frame over the wait period | 1.2*(S + P) 276MB | 0.2*F |
| StoreNone Erase prior information and previous frame over the wait period | 0.20*S 32MB | 0.15*F |
| StoreMotion Erase prior information, leave previous frame data over wait period | 1.2*S 192MB | 0.2*F |
| StorePriors Save prior information, but erase the previous frame data over wait period | 1.2*P+0.20*S 116MB | 0.15*F |

FIG. 8

SYSTEM FOR IDENTIFYING REGIONS OF INTEREST IN VISUAL IMAGERY

PRIORITY CLAIM

This is a Continuation-in-Part application of U.S. application Ser. No. 12/214,259, entitled, "Visual Attention and Segmentation System," filed on Jun. 16, 2008, and which is a non-provisional application of U.S. Provisional Application No. 60/944,042, entitled, "A Bio-Inspired System for Visual Object-Based Attention and Segmentation," filed on Jun. 14, 2007.

STATEMENT REGARDING FEDERALLY SPONSORED RESEARCH OR DEVELOPMENT

This invention was made with Government support under Contract No. W31P4Q-08-C-0254. The Government has certain rights in the invention.

FIELD OF INVENTION

The present invention relates to a visual surveillance system, and more particularly, to a system for efficiently identifying regions of interest in visual imagery.

BACKGROUND OF INVENTION

Recently, a great deal of interest has been generated in automated surveillance systems that utilize a wide field-of-view (FOV) to detect anomalies in a panoramic view or scene. Such systems typically employ an attention algorithm (i.e., saliency) as a first pass that analyzes the entire scene and extracts regions of interest, which are typically advanced to some other system for analysis and/or identification. The attention algorithm is also often used as a seed to a "surprise" algorithm that finds salient regions of interest that change and, therefore, could be a potential anomaly in the FOV. The attention and surprise algorithms must be very accurate, as any event that is not detected by these algorithms cannot be analyzed by subsequent algorithms in the system. However, since attention/surprise must be processed on every pixel in the imagery from the wide FOV, the attention/surprise algorithm requires a large amount of computational resources and often requires hardware to run the algorithms. Depending on the hardware used to run the algorithm, the requirement may either exceed the available resources of the hardware or require larger and more complex hardware (e.g., multiple field-programmable gate arrays (FPGAs)) resulting in bulky and high-power systems.

While a number of researchers have shown interest in systems that compute the saliency of a scene, there is currently no prior art that specifically addresses low Size, Weight and Power (SWaP) processing of wide FOV imagery that employs multiple cameras. The system using existing prior art in the general area of attention would consist of the trivial solution of running all cameras in the FOV and processing the continuous stream of frames using a conventional feature or object-based attention algorithm. Examples of such algorithms include the feature-based work of Itti and Koch (see Literature Reference No. 3) and Navalpakkam and Itti (see Literature Reference Nos. 6 and 7) and the object-based work of Khosla and Huber (see U.S. patent application Ser. No. 12/214,259), Draper and Lionelle (see Literature Reference No. 1), Orabona et al. (see Literature Reference No. 8). With respect to saliency, these systems run a saliency algorithm on the frames in a video stream and return a given number of possible targets based on their saliency in that frame.

The pure surprise algorithms (both feature and object-based) are incomplete because they yield poor results when applied to video imagery of a natural scene. Artifacts from ambient lighting and weather often produce dynamic features that can throw off a saliency algorithm and cause it to think that "everything is salient". Mathematically, it may be the case that everything in the scene is salient, but when a system is tasked with a specific purpose, such as surveillance, one is only interested in legitimate short-term anomalies that are likely to be targets. Therefore, simple saliency systems cannot provide the service that the current invention does.

An alternative approach to "pure surprise" is to use a full surprise algorithm. Full surprise algorithms employ a great deal of additional processing on the features in each frame of the video and create statistical models that describe the scene. If anything unexpected happens, the surprise algorithm is able to return the location of the happening. The closest known prior art to this invention is the surprise algorithm of Itti and Baldi (see Literature Reference No. 2). The work of Itti and Baldi employs a Bayesian framework and features that contribute to the saliency map to construct a prior distribution for the features in the scene. The current saliency map is used as the seed for a "posterior" distribution. This algorithm uses the KL distance between the prior and posterior as the measure of surprise. Because it takes the entire history of the scene into account, it exhibits a much lower false alarm rate than that of a system that exclusively uses saliency.

However, as one might expect from the description of the algorithm, the Itti and Baldi surprise algorithm is very complicated and computationally expensive. It was designed to run on very high-end computer hardware, and even then cannot currently run at real-time on high-resolution video imagery. The computer hardware it runs on is very bulky and power-consuming, which prevents its use on a mobile platform. Furthermore, the complexity of the algorithm largely prevents it from being ported to low-power hardware, which is essential for deployment on a mobile platform.

In addition to the above, there are a plethora of non-saliency based methods that model the background and then use changes in this model to detect "change" regions. Such methods fail and perform poorly since as they are not using saliency as a basis of attention. Previous work by D. Khosla, C. Moore, D. Huber, and S. Chelian on object-based attention and recognition has clearly shown that finding regions of interest via attention has very high detection and low false alarm rates and performs better than simple "change" detection methods (see Literature Reference No. 5).

Previous attempts to make the basic saliency algorithm more robust have only resulted in a larger computational burden. The transition from feature-based to object-based saliency algorithms increased the computational load on the system without any dramatic improvement in detection and false alarm rate. To accomplish any type of solid improvement in detection and false alarm rate, systems that employ other surprise algorithms were developed; these are very complicated and require large amounts of computer hardware in order to operate in real-time. Since real-time operation is critical to any surveillance operation, this requirement cannot be scaled back. Furthermore, the complexity of competing surprise algorithms makes it difficult to port to low-power hardware for implementation on a mobile surveillance platform.

Thus a continuing need exists for a system for identifying regions of interest in wide FOV imagery by finding "surprising" or changing saliency regions, with such a system being operable in real-time with a reduced computational cost compared to the prior art.

SUMMARY OF INVENTION

While considering the failure of others to make use of all of the above factors in this technology space, the inventor unexpectedly realized that by staggering the activity of multiple sensors across a wide field-of-view (FOV) in conjunction with a surprise algorithm would allow for effective surveillance of a wide FOV with a low computational cost.

More specifically, the present invention includes a method, computer program product, and system, each of which is directed (through acts or executions) to causing a processor to perform a series of operations. Such operations include receiving a series of consecutive frames representing a scene as captured from N sensors, the frames having at least a current frame and a previous frame; generating a surprise map based on features found in the current frame and the previous frame, the surprise map having a plurality of values corresponding to spatial locations within the scene; and determining a surprise in the scene based on a value in the surprise map exceeding a predetermined threshold.

In another aspect, generating the surprise map further comprises operations of:

splitting the current frame into four fully saturated color channels, an R-channel (R), a G-channel (G), a B-channel (B), and a Y-channel (Y);
generating a light intensity channel (L) and a dark intensity channel (D) from the current frame;
generating a series of color feature maps from the four color channels for the current frame using center-surround differencing between color channels, each color feature map representing a color feature;
generating a series of intensity feature maps from the two intensity channels for the current frame using center-surround differencing, each intensity feature map representing a color/intensity feature;
comparing the light intensity channel (L) from the current frame with an light intensity channel (L) from the previous frame to generate five motion feature maps, each motion feature map representing a motion feature;
generating a prior map (P) for each of the color and motion features by integrating the motion feature maps and the color feature maps over time;
updating the prior map as new current frames are received from the sensors;
generating a surprise feature map, for each feature, by determining a rectified difference between the feature map from the newest frame and its corresponding prior map;
generating a surprise color conspicuity map by combining and normalizing the RG and BY surprise feature maps;
generating an intensity surprise conspicuity map by normalizing the LD surprise feature map;
generating a motion surprise conspicuity map by combining and normalizing the five surprise feature maps for motion; and
generating the surprise map by combining and normalizing the surprise conspicuity maps, the surprise map having a plurality of values corresponding to spatial locations within the scene.

The present invention is also configured to stabilize the prior map through receiving new current frames and updating the prior map until a feature variance is less than a predetermined threshold.

In another aspect, in receiving a series of consecutive frames representing a scene as captured from N sensors, N is a plurality of fixed sensors and each sensor has a memory containing its own prior map (P) and the previous frame.

Further, in receiving a series of consecutive frames, if the frames are in black and white, the frames are converted into an red/green/blue (rgb) format of three channels, an red-channel (r), a g-channel (g), and a b-channel (b), where all three channels have the same value.

In splitting the current frame into four fully saturated channels, the channels are split as follows:

$$R = r - \frac{(g+b)}{2}, G = g - \frac{(r+b)}{2}, B = b - \frac{(r+g)}{2}, \text{ and}$$

$$Y = \frac{(r+g)}{2} - \frac{|r-g|}{2} - b.$$

Additionally, when generating a light intensity channel (L) and a dark intensity channel (D) from each frame, they are generated by averaging the r, g, and b-channels, as follows:

$L=(r+g+b)/3$ $D$=(maximum value of a color channel)$-L$.

Further, when generating five motion feature maps, the motion feature maps are generated based on motion across four cardinal directions and a glimmer.

Additionally, the processor is configured to perform an operation of memory management through selectively using a subset of the plurality of fixed the sensors to capture the series of consecutive frames. In selectively using the subset, the subset of sensors is selected such that the subset is active and used during a burst period, and deactivated during a wait period. Further, a memory management function selected from a group consisting of store all, store none, store motion, and store priors, as follows:

wherein in store all, the prior map (P) and the previous frame are maintained over the wait period;
wherein in store none, both the prior map and previous frame are deleted during the wait period;
wherein in store motion, the prior map is deleted during the wait period and the previous frame is maintained over the wait period; and
wherein in store priors, the previous frame is deleted during the wait period and the prior map is maintained over the wait period.

In another aspect, the system is configured to allow a user to selectively remove a sensor from the plurality of fixed sensors, leaving remaining sensors, which causes the system to adjust the memory management function by decreasing the wait period assigned to the remaining sensors.

In yet another aspect, the system is configured to weight the surprise feature maps to modulate the system's surprise response to specific features.

BRIEF DESCRIPTION OF THE DRAWINGS

The objects, features and advantages of the present invention will be apparent from the following detailed descriptions of the various aspects of the invention in conjunction with reference to the following drawings, where:

FIG. 8 is a table illustrating possible memory storage options for the programmed readout.

DETAILED DESCRIPTION

Figure 1:
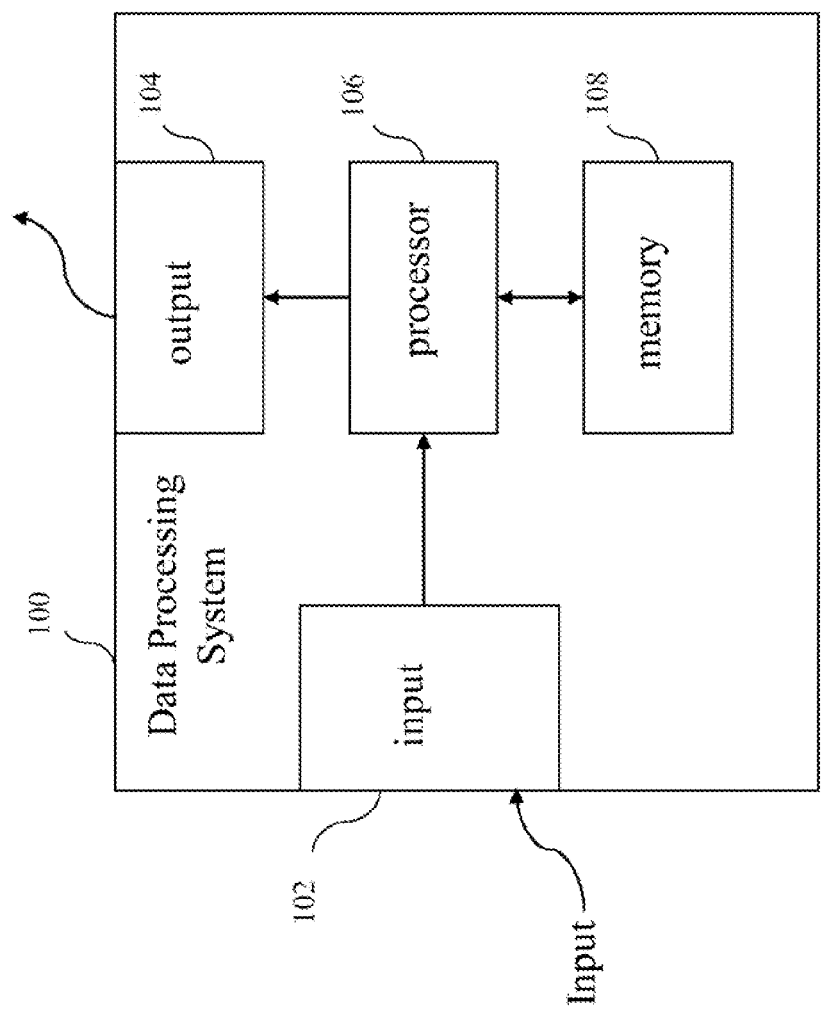
FIG. 1 is a block diagram depicting the components of system of the present invention.

The present invention relates to a visual surveillance system, and more particularly, to a system for efficiently identifying regions of interest in visual imagery. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a glossary of terms and table of abbreviations that are used in the description and claims is presented. Following the glossary, a description of various principal aspects of the present invention is provided. Subsequently, an introduction provides the reader with a general understanding of the present invention. Next, details of the present invention are provided to give an understanding of the specific aspects. Finally, a summary is provided as a synopsis of the present invention.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number.

1. B. Draper and A. Lionelle. Evaluation of Selective Attention under Similarity Transforms. In *Workshop on Performance and Attention in Computer Vision*. Graz, Austria, April 2003.
2. L. Itti and P. Baldi. Bayesian Surprise Attracts Human Attention. *Vision Research* 49: 1295-1306, 2008.
3. L. Itti and C. Koch. A saliency-based search mechanism for overt and covert shifts of visual attention. *Vision Research*, 40: 1489-1506, 2000.
4. L. Itti, C. Koch, and E. Niebur. A Model of Saliency-Based Visual Attention for Rapid Scene Analysis. *IEEE Transactions on Pattern Analysis and Machine Intelligence*, 20, 1254-1259, 1998.
5. D. Khosla, C. Moore, D. Huber, S. Chelian. Bio-Inspired Visual Attention and Object Recognition. In: *Proc. SPIE Defense, Security, and Sensing*, 6560, 656003, 2007.
6. V. Navalpakkam, L. Itti, Modeling the Influence of Task on Attention. *Vision Research*, 45: 205-231, 2005.
7. V. Navalpakkam, and L. Itti. An integrated model of top-down and bottom-up attention for optimal object detection, In: *Proc. IEEE Conference on Computer Vision and Pattern Recognition (CVPR)*, 1-7, 2006.
8. F. Orabona, G. Metta, and G. Sandini. Object-based Visual Attention: A Model for a Behaving Robot. In $3^{rd}$ *International Workshop on Attention and Performance in Computational Vision (in CVPR* 2005), San Diego, Calif., June 2005.

(2) GLOSSARY

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Attention—The term "attention" applies to two concepts that are used throughout this specification, saliency and surprise. Generally speaking, attention refers to an algorithm or method for finding regions in visual imagery that are anomalous due to saliency or surprise.

Glimmer—The term "glimmer" as used with respect to this invention generally indicates apparent in-place flashing or blinking that appears when viewing a series of frames. This is often the result of a target that appears and disappears rapidly between frames without moving in the field-of-view, or scintillation effects caused by reflecting light that changes from frame to frame, but does not move about the field-of-view.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Programmed Readout—A "programmed readout" is a method of handling image data from a set of sensors covering a wide field of view by processing them semi-simultaneously; the system reads a given number of frames from a given portion of a sensor array and processes them as a set before advancing to another portion of the sensor array. The system cycles through the sensors in the array and eventually returns to the original set when all have been processed.

Store All—The term "store all" refers to a memory management function where the prior map (P) and the previous frame are maintained in sensor memory over the wait period.

Store Motion—The term "store motion" refers to a memory management function where the prior map is deleted from the sensor memory during the wait period and the previous frame is maintained in sensor memory during the wait period.

Store Non—The term "store none" refers to a memory management function where both the prior map and previous frames are deleted by a sensor from the sensor memory during the wait period.

Store Priors—The term "store priors" refers to a memory management function where the previous frame is deleted from the sensor memory during the wait period but the prior map is maintained in the sensor memory over the wait period.

(3) PRINCIPAL ASPECTS

The present invention has three "principal" aspects. The first is system for identifying regions of interest in visual imagery. The system is typically in the form of a computer system operating software or in the form of a "hard-coded" instruction set. This system may be incorporated into a wide variety of devices that provide different functionalities. The second principal aspect is a method, typically in the form of software encoded on a memory, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a system of the present invention is provided in FIG. 1. The system 100 comprises an input 102 for receiving information from at least one sensor for use in receiving images/frames of a scene. Note that the input 102 may include multiple "ports." Typically, input is received from at least one sensor, non-limiting examples of which include video image sensors. An output 104 is connected with the processor for providing information regarding the presence and/or identity of object(s) in the scene to other systems in order that a network of computer systems may serve as a system for identifying regions of interest. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
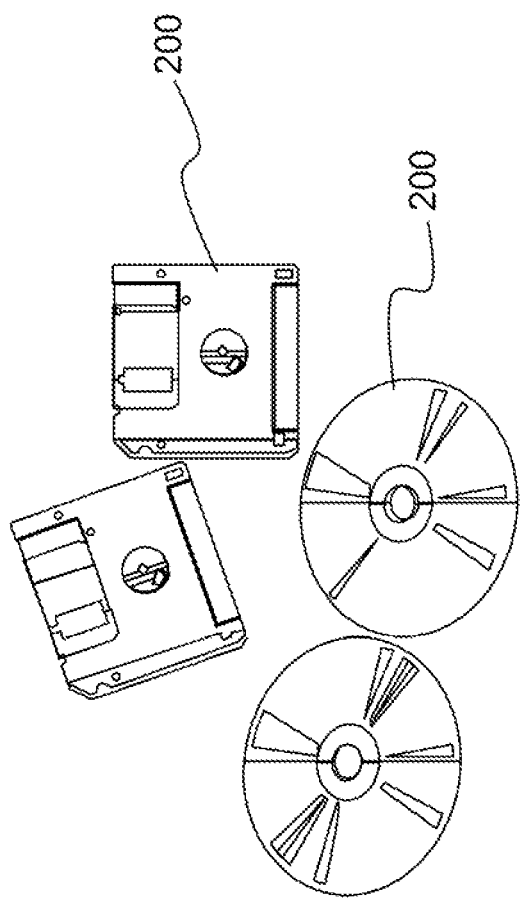
FIG. 2 is an illustrative diagram of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible non-transitory computer-readable medium.

(4) INTRODUCTION

The present invention is generally directed to a system for identifying regions of interest in visual imagery. More specifically, the present invention describes a method for computing saliency (i.e., finding interesting regions that catch attention) and surprise (i.e., finding salient regions that are changing) via reduced processing and power in multi-sensor wide field-of-view (FOV) imagery and video. A unique aspect of this invention is that it staggers the activity of the multiple sensors across the FOV and employs a method to manage the memory and statistical models used by the surprise algorithm. The present system and method can be used as a front-end to a larger system that includes object recognition and scene understanding modules that are cued by the detected salient or/and surprising regions.

The present invention can process attention/surprise algorithms for wide FOV imagery that conforms to low size, weight, and power constraints. This system processes frames from a subset of the sensor (e.g., camera) array for any given frame and employs what is called a "programmed readout", which allows the system to read a given number of frames from a given portion of a sensor array and process them as a set before advancing to another portion of the sensor array. The system can use the frequency of salient or surprise in regions and additional feedback from the subsequent processing stages to regulate both the size of the "burst" of frames, and the sensors that each burst is read from. It internally stores results and data from processing and intelligently uses this to compute saliency/surprise that accurately matches the scenario where in which all of the sensors acquire frames continuously. This provides flexibility that allows the saliency/surprise front-end to support higher levels of analysis by providing more information when necessary. By using programmed readout of frames, the system is able to use a fraction of the cameras from the FOV at any one time, which reduces the power demands of the system. Furthermore, this system reduces the size, weight, and power of the system (SWaP) by reducing the hardware necessary to process attention on the frames. For example, if only two cameras are used at a time, then the system only needs to have enough attention hardware to process two frames, as opposed to enough hardware to process frames from all cameras. Depending on the number of cameras required to capture the full FOV, this can result in substantial savings in SWaP. When properly implemented, this system can yield a detection and false alarm rate that is comparable with a "greedy" system that processes all frames from all sensors all of the time.

The present invention also describes a method for computing surprise (a dynamic improvement over saliency) in visual frame-based imagery and video via reduced processing and power. The concept of surprise is introduced since saliency algorithms may not work well for video of complex natural scenes, as they do not differentiate between continuous saliency and transient saliency. This distinction will be described in detail later. A surprise algorithm that employs temporal integration of saliency across multiple frames can make this distinction and, consequently, exhibits a much lower rate of false alarm than the saliency algorithm.

Another unique aspect of the present invention is that it provides a fast way to extract target candidates (items of interest that become interesting or anomalous due to change, e.g., a person crawling in bushes or a vehicle moving in a desert) from video using little processing beyond that of the initial computation of saliency. However, the target candidates provided by the surprise algorithm are often better than those provided by the saliency algorithm. The simplicity of the present surprise system allows it to compute surprise in real-time and allows it to be easily implemented in a hardware system for even faster processing with low power consumption.

Also, since surprise must be processed on every pixel in the imagery from the wide FOV, the attention/surprise algorithm requires a large amount of computational resources and often require hardware (e.g., FPGA or ASIC) to run the algorithms. Depending on the hardware used to run the algorithm, the requirement may either exceed the available resources of the hardware or require larger and more complex hardware (e.g., multiple FPGAs) resulting in bulky and high-power systems. In resolving resource issues, the present invention includes a system and method to compute the surprise of a scene using video imagery that applies only a small additional calculation to the base saliency (or attention) algorithm. This simplicity allows it to be mapped to hardware that conforms to low size, weight, and power constraints. Additionally, because it requires minimal calculations beyond what the saliency algorithm requires, the surprise method of the present invention can also run at or near real-time.

The present invention is useful for any application that monitors a scene for the purpose of finding interesting or unusual regions or occurrences that employ a wide field of view. For example, it can be employed to search and rescue operations or in surveillance applications where any activity is an unexpected occurrence, such as in a desert or mountain range, or on the open sea. It is particularly useful in applications where size, weight, and power are at a premium. Furthermore, a system according to the present invention can be used as a front-end for any application that employs visual object recognition and scene understanding to extract regions of interest for identification. Other examples of potential applications include automotive safety, factory safety and efficiency, autonomous systems, robotics, intelligence analysis, et cetera.

(5) DETAILS OF THE INVENTION

A key to any robust automated surveillance system is a wide field-of-view (FOV). A wide FOV is usually captured with a single, high-resolution sensor on a movable base that scans across a fixed FOV. The sensor yields a single data stream, which can be processed as a single coherent unit by a single attention processor. Note that the term attention applies to two concepts—saliency (i.e., finding interesting regions that catch attention) and surprise (i.e., finding salient regions that are changing). Thus, although the present invention is described in the context of "surprise" attention, it is not intended to be limited thereto as it is also applicable to "saliency" with minor modifications.

A system with a single sensor that scans across a fixed FOV exhibits a serious flaw; the sensor cannot cover the entire FOV at once, and there is possible delay whenever it must move to a new position that is far from its current position. Also, the motion of the sensor causes an "egomotion" artifact (where the entire scene appears to move) that can make the attention algorithm fail to detect the motion of targets. Furthermore, the moving parts that move the camera can break, incapacitating the system. While a single-sensor system is capable of looking at any part of a wide field of view panorama, it can only look at one region at a time, which means that part of the panorama is always missed at any given time.

Figure 3:
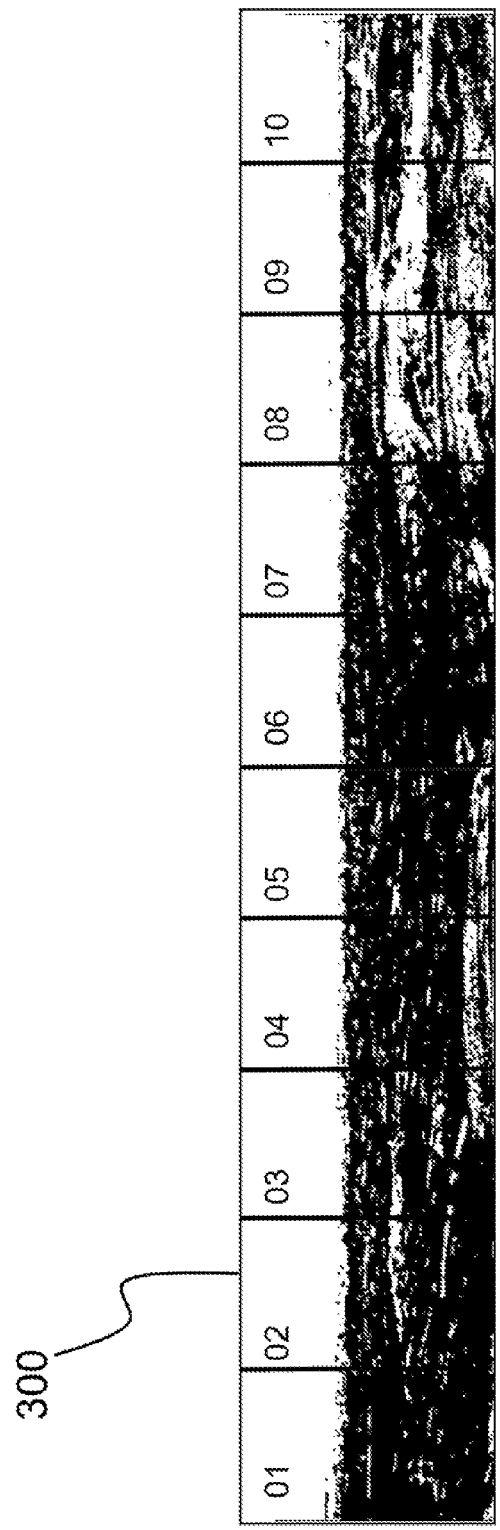
FIG. 3 is an illustration of a panorama image captured by a wide field-of-view (FOV) fixed multiple-sensor (e.g., camera) array.

As shown in FIG. 3, an alternative strategy is to use multiple fixed cameras that cover the entire FOV 300 through a plurality (N) of fixed sensors. The non-limiting example depicted in FIG. 3 covers 120 degrees using ten sensors; the number of the sensor that contributed to each part of the panorama is designated by its number. Since this is high-resolution imagery, the attention cannot be processed for the entire panorama using a single processing unit. Each camera captures part of the image by streaming to its own attention processor, which finds regions of interest in each part of the panorama. In this system, the entire field of view is captured at once. However, this system multiplies the resources of the single-camera system, because each independent sensor consumes power. Additionally, each sensor requires its own hardware for processing attention, which consumes additional power and increases the volume and weight of the overall package. This solution is often unacceptable for surveillance applications that require low size, weight, and power (SWaP).

The present invention strikes a compromise between the paradigm of the single movable sensor (which is more SWaP efficient) and that of the multiple, simultaneously running, stationary sensor array (which is more effective/functional). The present invention includes a system controller that reads a fixed number of frames from a subset of parallel fixed sensors and processes them using the "surprise" attention engine before reading in frames from another subset of sensors. Since "surprise" attention is not processed for all of the sensors simultaneously, the need for redundant attention-processing is reduced hardware. Also, since a subset of the sensor array is used at any one time, the power requirements of the system are greatly reduced. This method allows the system to process the entire panorama in discontinuous fragments through a programmed readout of the video frames. Because each sensor is not operated continuously, there will be small gaps in the coverage; the management of the state of the attention models during these gaps is critical to the performance of this invention.

Thus, the present invention improves upon the prior art by using (1) "surprise" attention in combination with a (2) programmed readout. For clarity, each of the concepts will be described, in turn, below.

(5.1) Surprise Attention

Humans can analyze a scene quickly, effortlessly noticing objects, even those that the viewer has never seen before. A viewer may be looking for something in particular, which affects how attention is paid within the scene. A viewer can also pay attention over a span of time, and the human visual system can "tune-out" repeatedly distracting features within a scene so as to be more sensitive to new and unexpected anomalies. Computationally, however, paying attention to a scene and extracting highly surprising locations or regions provides a great challenge. A robust vision system must be able to compute the saliency of regions of a scene, integrate the saliency at each spatial location over time, and determine what locations in a scene draw the most surprise so that they can be identified or interpreted. Because working with a real-time data stream requires that the algorithm must work quickly efficiently so as to keep up with the data input rate, the computational resources required to properly process surprise are typically quite extreme. Recently, specialized hardware systems have been developed to compute surprise in real-time without employing a large amount of generic computer hardware (server systems, etc.). However, implementing surprise algorithms in hardware are not without their disadvantages, as typical surprise algorithms are often very complex, and the size, weight, and power of a hardware system is generally proportional to the complexity of the algorithm.

In detailed dynamic imagery, surprise algorithms often provide better detection of anomalous events than simple saliency algorithms, which process single frames independently of one another. A basic saliency algorithm run on a stream of input data will return the salient objects or events from that specific frame, only using other frames in a very limited way (e.g., to compute motion). Even then, the saliency algorithm will only use the previous frame to calculate dynamic features. There is no notion of continuity or memory across multiple frames and consequently, the resulting saliency maps can be very noisy. For example, a forest scene in a slight breeze is likely to contain a lot of motion, and a saliency map will detect it all. However, all of this saliency can easily swamp the system and blind it to other, more anomalous results, such as animals or vehicles of interest. Even if the target were a different color and clearly visible in the scene, it might be difficult to differentiate between the target's saliency and the ambient saliency of the scene. Surprise algorithms are immune to this type of swamping, and often provide better detection of anomalous events in detailed dynamic imagery than simple saliency algorithms. This is because rather than processing single frames quasi-independently of one another to perform basic anomaly detection, surprise algorithms integrate the information provided by the saliency maps over multiple frames in order to differentiate between salient background "noise" events and events that are anomalous to the long-term structure of the scene. Because the surprise algorithm uses saliency but clearly improves upon its output by incorporating a notion of temporal integration, it should not be considered as a competitor to saliency, but rather as an extension of the saliency concept to the instance where input comes as continuous frames.

The surprise portion of the present invention can be used as a stand-alone module for identifying important regions of dynamic visual imagery (i.e., video) where object identification is not critical to the task, or as part of a larger vision system that includes modules for object classification and identification subsequent to surprise map generation. Examples of these applications include automatic surveillance systems, intelligent image analysis, search and rescue, embodied robots, detection of obstacles by an unmanned vehicle, et cetera.

Figure 4:
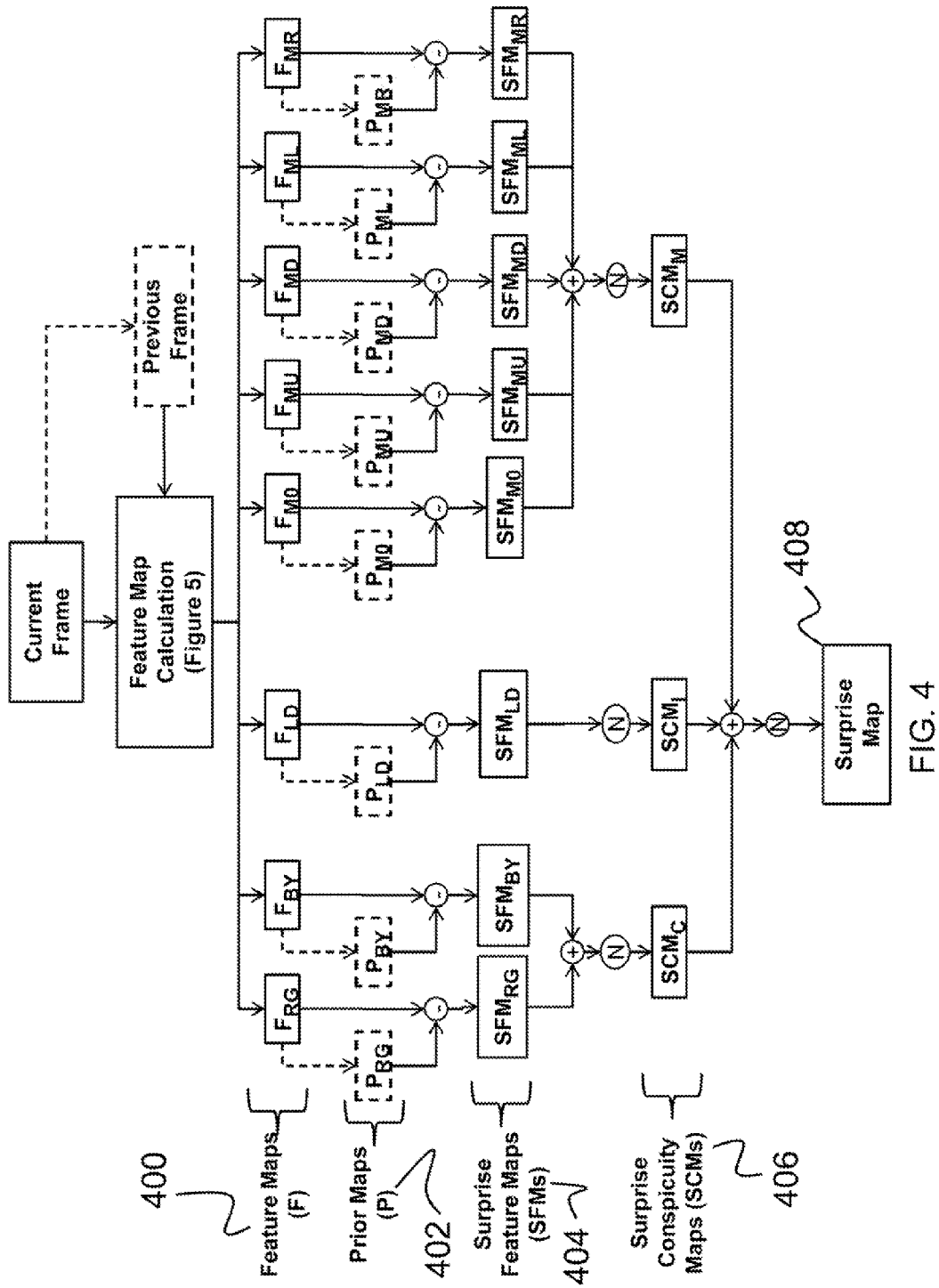
FIG. 4 is a flow diagram illustrating a method for computing surprise.

While there may be many different ways of computing surprise, the present invention provides a very efficient and fast way of determining surprise. FIG. 4 provides a flow diagram depicting a method for determining surprise for visual imagery (although it should be understood that the present invention can also be used for other sensory modalities, such as audio). Blocks formed of dashed-lines represent modules that must be stored in memory between frames. Dashed-lines ending in arrows represent steps that are taken to prepare for the next frame, and are processed after computing the surprise for frame t, but before computing the features for frame t+1. The '−' blocks represent pixel-by-pixel rectified subtraction, while the '+' blocks represent pixel-by-pixel addition, and the 'N' blocks represent map normalization.

As shown in FIG. 4, the first step is to generate a series of feature maps 400 representing color contrasts, intensities, and motion patterns from a series of consecutive static color images of a scene representative of continuous frames in a video. The process for generating the feature maps is further detailed in FIG. 5.

Figure 5:
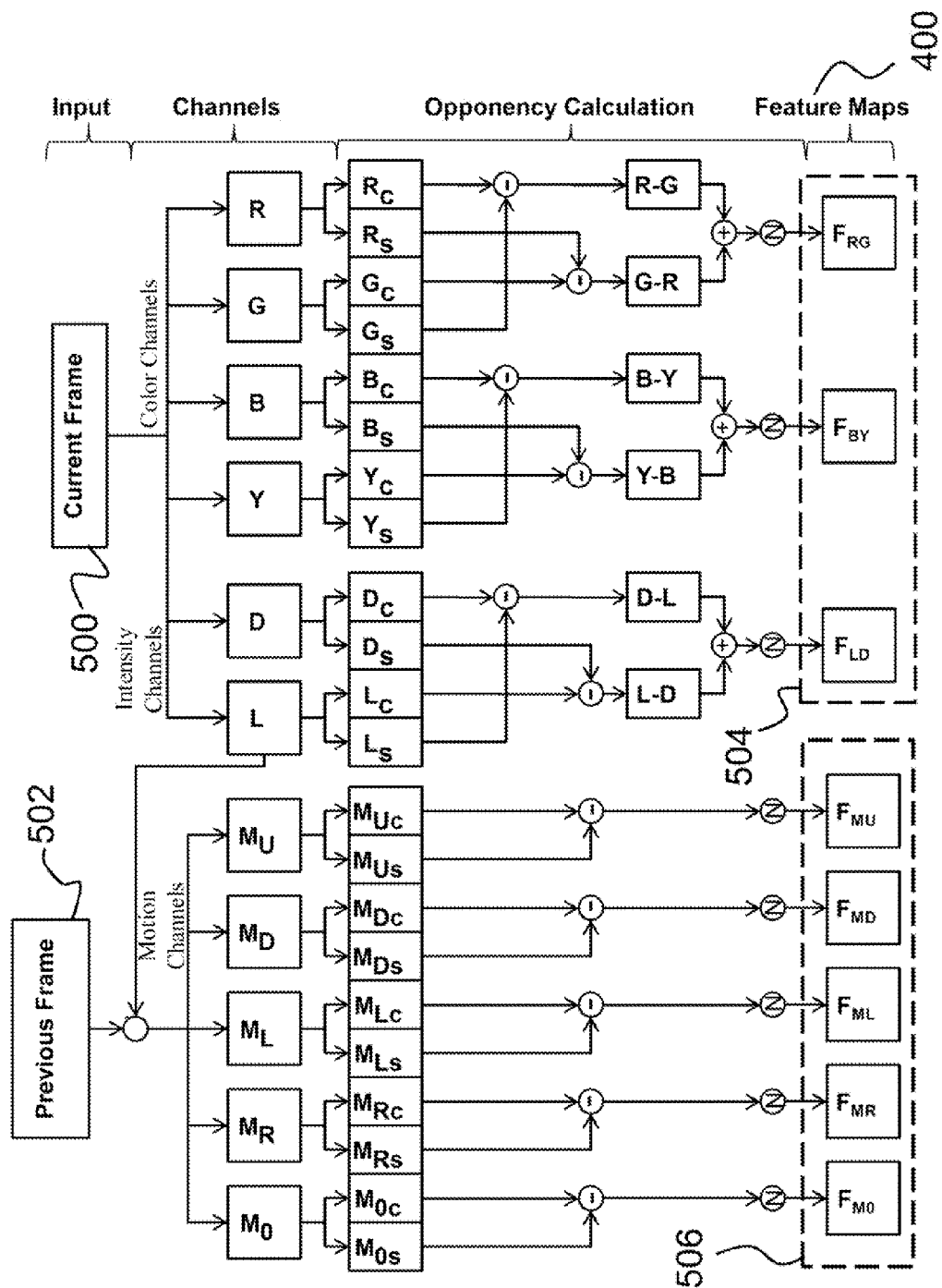
FIG. 5 is a flow diagram illustrating a method for computing feature maps.

As shown in FIG. 5, the process for generating a series of feature maps 400 includes receiving a series of consecutive frames (an image sequence) representing a scene as captured from N sensors, the frames having at least a current frame 500 and a previous frame 502.

If the image sequence is in black and white, it is converted into an RGB format (red-channel (r), green-channel (g), and blue-channel (b)) where all three channels have the same value (retaining the black-and-white appearance) for feature map calculation. The image is further broken (split) into four fully-saturated channels (red (R), green (G), blue (B), and yellow (Y)) that yield zero-response to white, as follows:

$$R = r - \frac{(g+b)}{2}, G = g - \frac{(r+b)}{2}, B = b - \frac{(r+g)}{2}, \text{ and}$$

$$Y = \frac{(r+g)}{2} - \frac{|r-g|}{2} - b.$$

Additionally, a pair of intensity channels, a light intensity channel (L) and a dark intensity channel (D), are calculated from the input image by averaging the red, green, and blue channels, as follows:

$L=(r+g+b)/3$ and $D=$(maximum value of a color channel (e.g., 255))$-L$.

These processes effectively separate the effects of the color and intensity channels. For each of these channels, all negative values are thresholded at zero. Thus, based on the method described above, four fully saturated channels and the light and dark intensity channels are generated from the current frame 500.

Additionally, channels corresponding to motion in various directions are generated by differencing (comparing) the intensity channels (L) of the current and previous frames at a slight directional offset. As a non-limiting example, the differencing of the intensity channels of the previous frame and current frames can be done for the four cardinal directions: up, down, left, and right, as well as once without any offset (which detects objects that move in place or appear to "glimmer"), thereby resulting in a series of motion channels $M_U$, $M_D$, $M_L$, $M_R$, and $M_O$, respectively. While there are certainly more input channels that one might conceive, this particular set represents the most basic required for adequate performance of the surprise algorithm.

Next, a series of color feature maps 504 (i.e., $F_{BY}$, and $F_{RG}$) are generated from the color channels in the current frame using center-surround differencing between color channels. Each color feature map represents a color feature in the current frame. Further a (or series of) intensity feature map 505 (i.e., $F_{LD}$) is generated from the two intensity channels for the current frame using center-surround differencing. Each intensity feature map representing a color/intensity feature. Finally, a series of motion feature maps 506 (i.e., $F_{MO}$, $F_{MR}$, $F_{ML}$, $F_{MD}$, and $F_{MU}$) are generated from the motion channels. Each motion feature map representing a motion feature between the current and previous frame.

As can be appreciated by one skilled in the art, there may be multiple techniques for developing the color and motion feature maps 504 and 506. As a non-limiting example, center-surround color maps corresponding to the receptive fields in the retina for red-center/green surround, green-center/red-surround, blue-center/yellow-surround, bright-center/dark-surround, and dark-center/bright-surround and for the motion channels (center and surround are from motion in the same direction) are computed from the input channels from the Difference of Gaussians (DoG) between an "ON" center feature, and a contrasting "OFF" surround feature. Both the center and surround channels are convolved with a two-dimensional Gaussian kernel, where the surround kernel has larger bandwidth than the center kernel. A feature map is computed when the surround channel is subtracted from the center channel. In instances where opponency is calculated (such as with color and intensity), the opponent maps are added before normalization; this ensures that the feature map is unbiased toward one contrasting feature over another. As shown in FIG. 5, the '−' blocks represent pixel-by-pixel rectified subtraction, while the '+' blocks represent pixel-by-pixel addition, and the 'N' blocks represent map normalization. This process is repeated for each center-surround channel pairing, which includes each of the color and intensity contrasts, and the motion directions. Each feature map is normalized between zero and one. The resulting set of feature maps indicates anomalous regions along that particular feature within the still frame of the scene, and each frame in the video sequence generates its own series of feature maps 400.

Referring again to FIG. 4, after the feature maps 400 are generated, the next step is to compute a baseline or "status quo" within the scene for each feature, so that the system can detect when an event occurs that disagrees with the historical distribution of features within the scene. This is done by computing a prior map (P) 402, for each feature by integrating the sequence of feature maps over time. Each pixel (i,j) in the prior map corresponds to a specific spatial location in the original image from the camera. There are many possible ways to integrate the information from a temporal series of feature maps into a prior map, but the simplest process is through a weighted expected value (i.e., the mean) of feature maps over time, where more recent frames provide a stronger influence on the prior map than frames encountered long ago. As a nonlimiting example for a given feature, x, this can be expressed for any spatial location i,j in the prior map P at the current time, t, as:

$$P_x(i, j; t) = \sum_{T=o}^{t} w_x(t, T) F_x(i, j; T)$$

where Fx represents the feature map for feature x at location i,j at some previous time T. The weights, wx, are a decaying sequence determined by some time constant, for example:

$$w_x(t, T) = k_x e^{-\frac{t-T}{\tau}}$$

with kx values chosen to satisfy the constraint that the sequence of weights for a single feature, x, sum to one. In this way, entries from more recent feature maps are weighted more heavily than entries from older feature maps, and the value of τ determines how quickly older information is "forgotten"; when τ is large, only recent feature maps are employed.

This method requires the storage of t feature maps, which is generally not difficult as these maps are generally decimated from the original image. As new frames are processed, the new feature maps are integrated into the existing prior maps, ensuring that they always remain up-to-date with the most current features of the scene. This is particularly important if the system is meant to be run for a long period of time, where atmospheric and lighting conditions are likely to change over the course of the sequence. While there is no specified training period and the system can begin to generate surprise maps immediately after the system begins to process frames, it is generally a good idea to allow the prior map to stabilize before seriously considering the results.

Optionally, this system could employ different time scales for the weighting. For example one set of weights could use a time constant, τ, that is larger, and hence the weights decay more slowly, placing increased emphasis on older values, while a set of weights corresponding to a shorter time scale could be employed to emphasize more recent events. If this method is employed, then the prior map would be equal to some normalized combination of the maps from these two time scales.

Once the system has generated a relatively stable prior map, one can generate the surprise map. The first step is to compute the rectified difference between each feature map for the newest frame (at time t+1) and its corresponding prior map, as follows:

$$SFM_{ij}(t+1) = |P_{ij}(t) - F_{ij}(t+1)|.$$

The resulting map provides a spatial map for each feature that shows how much the current scene deviates from the norm for that feature. These are known as surprise feature maps (SFMs) 404. The surprise feature maps that correspond to a given feature type are added and normalized to create surprise conspicuity maps (SCMs) 406. More specifically, a surprise color conspicuity map ($SCM_C$) is generated by combining and normalizing the RG and BY surprise feature maps. An intensity surprise conspicuity map ($SCM_I$) is generated by normalizing the LD surprise feature map, while a motion surprise conspicuity map ($SCM_M$) is generated by combining and normalizing the five surprise feature maps for motion.

Finally, the SCMs are added together and normalized to create a surprise map, which consists of a plurality of values that correspond to how far each region in the current frame deviates from what is expected (i.e., the "surprise"). Since the dimensions of the surprise map are directly proportional to the input frame, each value in the surprise map (which range from zero to one after normalization) directly corresponds to a specific region of the camera frame. Thus, a surprise can be identified in the scene based on a value in the surprise map exceeding a predetermined threshold.

After surprise is computed for the frame, the feature maps are integrated into the appropriate prior maps, so that they are updated with the most recent information.

A method of top-down biasing of the surprise algorithm might be obtained by applying weights to each of the surprise feature maps and surprise conspicuity maps during their addition. For example, each of the '+' blocks in FIG. 4 would represent a weighted addition, rather than a simple addition. The top-down biasing can be combined with a user feedback loop, in which the user indicates which regions returned by the surprise algorithm contain a target, versus those that are false alarms. For example, for each false alarm indicated by the user, the system could look at the surprise feature map values that contributed to the erroneous surprise score and decrease the weight of the surprise feature maps that contributed most strongly to the surprise score (how to adjust the weights is arbitrary). In this way, the system is unlikely to return the same region of interest for the same reason as it originally did. However, since the inhibition is specialized to a fixed subset of channels, this provides the advantage that if an event actually occurs in that region of the scene, the surprise system will not be blind to it due to the inhibition.

It should be noted that while the aforementioned example assumes that the sensors on the system are cameras collecting video data, a similar surprise algorithm can be devised for any type of sensory input and, therefore, this system can be applied to any type of sensor array. For the purpose of this application, it is assumed that the surprise is computed in hardware as a black box, whose only inputs are the current frame of sensor data, the previous frame of sensor data (for dynamic feature computations), and the most recent set of prior maps, which are updated and returned by the hardware as each frame is processed. This level of abstraction maximizes the applicability of the system, and reduces the need to cater to specific nuances of the surprise algorithm. In fact, this invention does not depend on the specific implementation of the surprise algorithm apart from the memory structures that are stored.

(5.2) Programmed Readout of Frames

As noted above, the present invention employs a method of "programmed readout" of the frames from the sensor array in order to balance out the processing of the various sensors, thereby reducing their power consumption and the resources required to process the sensor data. Using this paradigm, a subset of the sensor array is active at any one time (during a burst period), and the system cycles through sensor subsets at some fixed interval until they have all been processed, at which point, the system returns to the original subset of sensors. The system contains enough hardware to process attention on just one subset of the sensor array (e.g., two attention processors if the sensors are activated in pairs), and data from each sensor is multiplexed through the attention system (as shown in FIG. 6).

Figure 6:
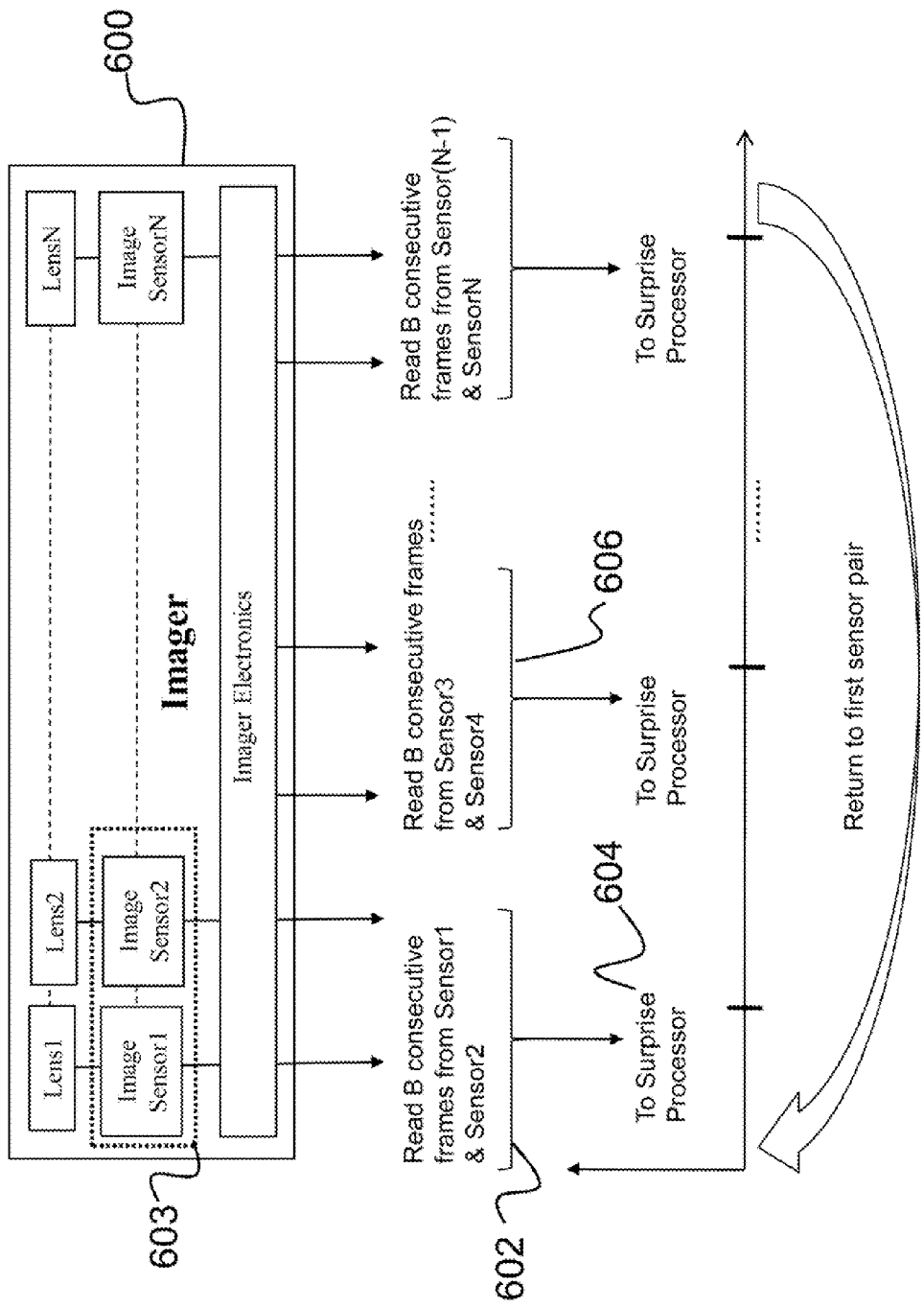
FIG. 6 is a system diagram illustrating a wide-FOV, fixed sensor system with programmed readout of frames.

For example and as shown in FIG. 6, the imager 600 includes of a plurality of fixed sensors that cover the entire field of view. A "burst" of 'B' consecutive frames 602 is read by a subset of the sensors (in this case a side-by-side pair 603) and sent to the surprise processor 604. The next pair of sensors processes the next burst of frames 606, and so on. At the end of the cycle, the first subset of sensors 603 is reactivated. The time between the shutdown of a set of sensors and their reactivation is called the "wait period", and is determined by the burst period, number of sensors total, and the size of the subset of sensors active at any one time.

Processing one subset of the sensor array allows the system to reduce its weight and volume considerably. Instead of having the processing hardware to support all sensors at once, the present invention only requires enough attention processing hardware to process the subset of sensors, which may be as small as one or two sensors. For example, this computational cost of running the subset is 20% to 10% of the cost of running the full hardware. Additionally, because only a subset of sensors is active at any one time, the power consumed by the sensor array is only a fraction of that when the entire array is active. This allows the system to maintain a very low SWaP profile and operate very efficiently.

A fundamental difference between the solution that employs all sensors all of the time (i.e., a "greedy" system) and the current invention is the management of memory around the wait times (i.e., wait period) in between bursts (burst period). In a "greedy" system that continuously processes sensor data, all memory associated with the computation of surprise, such as the previous frame data and surprise models, can be located on the attention hardware. However, since this invention employs the same attention hardware to process the surprise associated with multiple sensors, a memory store must be set up for each sensor external to the attention processor so that it can retain a copy of the most recent frame processed (for computing dynamic channels) and the prior distribution of the surprise for the sensor. Thus, each sensor has a memory containing its own prior map (P) and the previous frame. This memory is loaded into the surprise processor prior to each burst, updated, and then returned to memory at the end of the burst. Allow each sensor to maintain and update its own memory prevents data conflicts between the sensors as they share the same attention processing resources.

Figure 7:
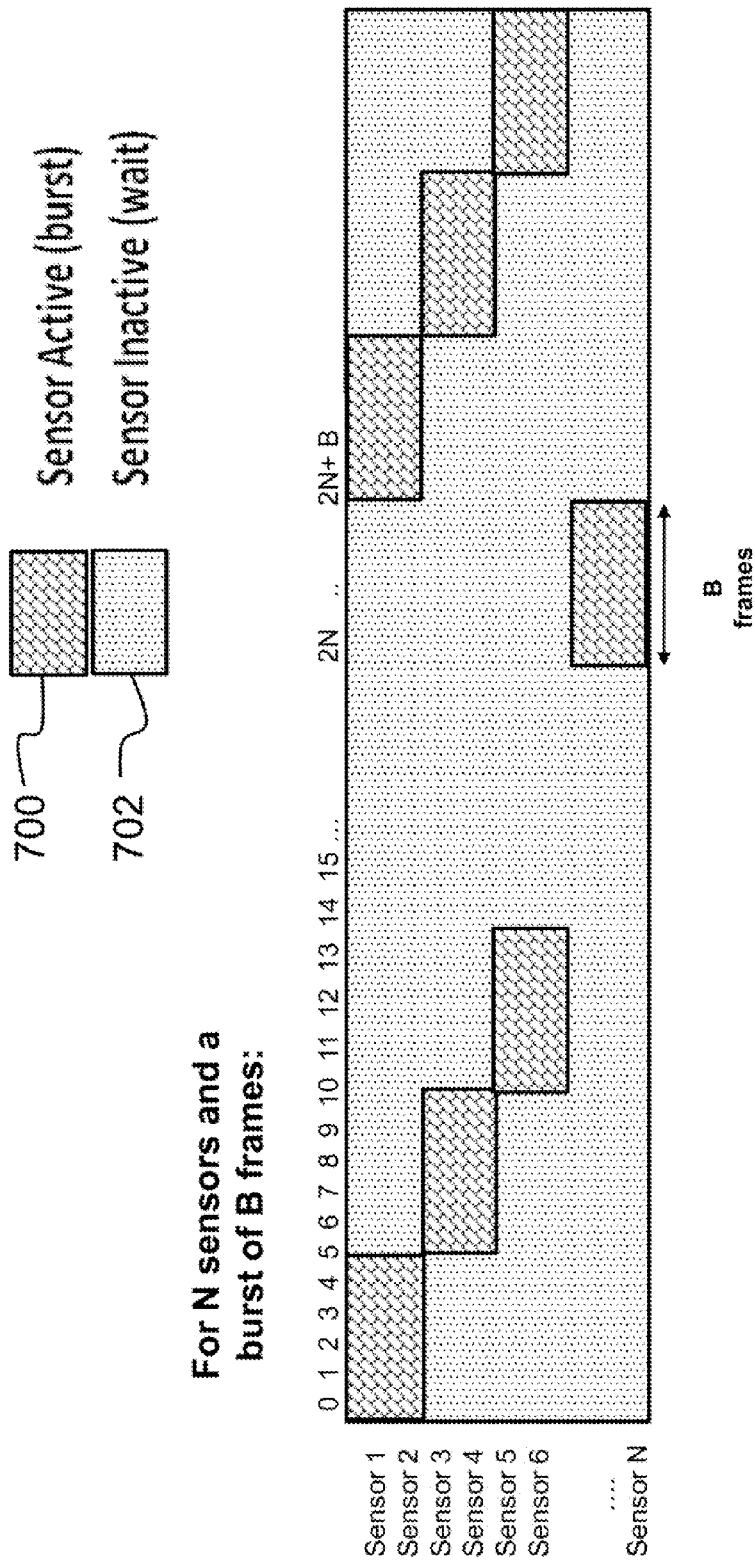
FIG. 7 is an timeline chart illustrating a sample timeline of a programmed readout for an arbitrary number of sensors.

A timeline of the programmed readout mode is illustrated in FIG. 7, which depicts a sample timeline for an arbitrary number of sensors. In this example, sensors work in pairs, and read 'B' frames at a time. At the end of this processing period, the next pair of sensors turns on and read another 'B' frames. This process continues until all 'N' sensors have been processed. After all of the N sensors have been processed, the system returns to the first sensor pair at frame 2N+B. Because only two sensors are processed at a time, the system only requires attention processing hardware for two sensors.

A subset of the sensors is active at any one time (active sensors 702 during a burst period); the rest are inactivated (inactive sensors 704 during a wait period). Each sensor subset may consist of one or many sensors that are adjacent or distant from one another in the field of view. The sensor subset reads in a fixed number of frames (called a "burst period", its length denoted by 'B') and processes them using the attention processor. After the burst period is complete, the results of the attention process (this can be the surprise maps for the processed frames, a list of surprising locations and frame numbers, a priority queue, etc.) are stored off processor, in addition to the prior maps (see next section for a caveat) and intensity map of the most recently encountered frame for future motion processing. Then the active sensors shut down/deactivate (for a wait period) and the next subset of sensors activate (for a burst period). They read in a burst of frames, send to the processor, and also shut down. The system cycles through the sensors until all have been activated and processed. At this point, the first subset of sensors is reactivated, and the cycle continues. From the perspective of a single sensor, this appears to be a set of continuous frames corresponding to the length of the burst, followed by a long "wait" period, in which no data is collected. To the attention processor, this appears as a long gap in the data stream. The length of the wait period (denoted as 'W') is dictated by the number of sensors, burst length, and size of the subset of sensors that processes data at any given time.

Of particular importance to the present invention is how the attention-related memory is managed (i.e., the memory management) by the system to track the dynamic features and surprise map of each sensor. Recall that the attention processor requires that two pieces of data be stored for each sensor: (1) the previous frame (for processing motion and other dynamic features) and (2) the prior maps required for computing surprise across the "wait" period, during which the given sensor is inactive. During that time, a lot of factors may change in the scene, including contents and lighting conditions. Depending on the length of the burst and wait period of the programmed readout, some bits of prior information might be more useful than others. As such, knowing which information to use turns out to be critical to accurate detection of events. The system can either save or discard the previous frame across the wait period, as can it store or discard the prior information generated by the surprise algorithm. This provides four conditions for memory management across the wait period: (1) "Store All", (2) "Store None", (3) "Store Motion", and (4) "Store Priors". These memory management configurations are indicated in the table that is depicted in FIG. 8.

The first line, labeled "Continuous (Baseline)" indicates the memory and processing requirements of the "greedy" system that runs all sensors in continuous operation. To show the relative difference between this algorithm and the advanced memory and processing management of the other algorithms, a series of baseline variables can be defined. In this case, S refers to the amount of memory required to store the previous frame for the camera array (needed to compute motion), P refers to the amount of memory required to store the prior information for the camera array, and F refers to the processing cost for this operation. These are defined as such as to be independent of image size and computer processing power. The non-limiting examples as provided below assume a system that uses five cameras. As will be shown in the next section, different memory configurations show different levels of success depending on the length of the burst and wait periods, and more memory is not necessarily better. The present invention is capable of running in all four memory modes, which may be switched between depending on the burst length selected, number of sensors, activity being monitored, size of sensor subset, etc.

As an alternative to the baseline, in store all, the prior maps and the previous frames for each camera are maintained over the wait period. In this scenario, the processing time is reduced dramatically, since the computer must only process one camera at a time. However, the memory required increases since extra memory is needed as a buffer for incoming frames. In store none, both the prior map and previous frame are deleted during the wait period, which requires only enough memory to buffer incoming frames and exhibits a reduced processing requirement. In store motion, the prior map is deleted during the wait period and the previous frame is maintained over the wait period. This method requires extra memory for buffering frames, but does not need memory for priors. Finally, in store priors, the previous frame is deleted during the wait period and the prior map is maintained over the wait period. In this case, the system requires memory to buffer the priors, as well as buffer for a single extra frame and prior. Each of the algorithms outlined in this invention exhibit dramatically reduced computer processing requirements over the baseline.

A final feature of the programmed readout module is the ability to change the length of the bursts at each sensor based on feedback from the subsequent processing modules. For example, if the system were the front-end to a system that performs scene analysis or actionable intelligence, it could receive feedback to increase the burst size on certain sensors in circumstances where the end-system thinks that there might be potential target, but requires more visual data to make a decision. The system might be set to automatically adjust the burst length based on apparent activity in the scene; the system could increase the burst length of a part of the panorama that consistently finds a large number of target candidates, while shortening the bursts for regions that are relatively boring. This might allow the system to reduce the false alarm rate for the sensor that contains a lot of salient targets by providing more time to analyze motion and behavior patterns over a longer time period. Additionally, a user might wish to modify the burst patterns for the sensors in the panorama based on perceived risk. For example, a sensor pointed at the ocean might require less attention (and shorter bursts) than a sensor pointed at a road leading over a crest, where a target vehicle might approach very quickly and without warning. In other instances, the user might even elect to turn some of the sensors off, freeing up processing power to analyze the remainder of the scene. This might be useful in an environment such as a canyon, where one or more sensors might be completely obstructed.

(6) SUMMARY

As noted above, the present invention is directed to a system for efficiently identifying regions of interest in visual imagery. The system employs a wide-FOV sensor array consisting of multiple fixed sensors that cover the entire panorama. To reduce the computational cost, the present invention uses a fixed fraction (subset) of the available sensors at any one time. Thus, the system reads in a fixed number of frames for a subset of the sensors and processes them as a continuous unit, before advancing to the next subset of sensors. To improve efficiency, the system can adjust the number of frames read by each sensor according to feedback from subsequent stages of processing. Further, the system includes a memory management function that manages the memory of the surprise algorithm during gaps in the readout of each sensor, which results in less surprise-processing hardware than a system processing continuous frames across all sensors. Although the system operates in a low power and processing mode due to this reduced sensor and processing load, the system is still capable of exhibiting detection and false alarm rates comparable to those obtained from processing continuous frames.

What is claimed is:

1. A system for identifying regions of interest in visual imagery, the system comprising:
    a processor;
    a memory, the memory including executable instructions encoded thereon that, when executed by the processor, causes the processor to perform operations of:
        receiving a series of consecutive frames representing a scene as captured from N sensors, the frames having at least a current frame and a previous frame;
        generating a surprise map based on features found in the current frame and the previous frame, the surprise map having a plurality of values corresponding to spatial locations within the scene; and
        determining a surprise in the scene based on a value in the surprise map exceeding a predetermined threshold
        wherein the processor uses a number B, less than N, of the N sensors to capture the series of consecutive frames, such that the B sensors are active during a burst period and are deactivated during a wait period during which at least one of the remaining sensors is active, and
        wherein the processor determines, for the B sensors, whether to store over the wait period at least one of a prior map and the previous frame.

2. The system as set forth in claim 1, wherein the operation of generating the surprise map further comprises operations of:
    splitting the current frame into four fully saturated color channels, an R-channel (R), a G-channel (G), a B-channel (B), and a Y-channel (Y);
    generating a light intensity channel (L) and a dark intensity channel (D) from the current frame;
    generating a series of color feature maps from the four color channels for the current frame using center-surround differencing between color channels, each color feature map representing a color feature;

generating a series of intensity feature maps from the two intensity channels for the current frame using center-surround differencing, each intensity feature map representing a color/intensity feature;

comparing the light intensity channel (L) from the current frame with an light intensity channel (L) from the previous frame to generate five motion feature maps, each motion feature map representing a motion feature;

generating a prior map (P) for each of the color and motion features by integrating the motion feature maps and the color feature maps over time;

updating the prior map as new current frames are received from the sensors;

generating a surprise feature map, for each feature, by determining a rectified difference between the feature map from the newest frame and its corresponding prior map;

generating a surprise color conspicuity map by combining and normalizing the RG and BY surprise feature maps;

generating an intensity surprise conspicuity map by normalizing the LD surprise feature map;

generating a motion surprise conspicuity map by combining and normalizing the five surprise feature maps for motion;

generating the surprise map by combining and normalizing the surprise conspicuity maps, the surprise map having a plurality of values corresponding to spatial locations within the scene.

3. The system as set forth in claim 2, wherein the processor is further configured to perform an operation of stabilizing the prior map through receiving new current frames and updating the prior map until a feature variance is less than a predetermined threshold.

4. The system as set forth in claim 3, wherein in receiving a series of consecutive frames representing a scene as captured from N sensors, N is a plurality of fixed sensors and each sensor has a memory containing its own prior map (P) and the previous frame.

5. The system as set forth in claim 4, wherein the processor is configured to perform an operation of memory management through selectively using a subset of the plurality of fixed the sensors to capture the series of consecutive frames.

6. The system as set forth in claim 5, wherein in selectively using the subset, the subset of sensors is selected such that the subset is active and used during a burst period, and deactivated during a wait period.

7. The system as set forth in claim 6, wherein in selectively using the subset, the processor is configured to perform a memory management function selected from a group consisting of store all, store none, store motion, and store priors, as follows:

wherein in store all, the prior map (P) and the previous frame are maintained over the wait period;

wherein in store none, both the prior map and previous frame are deleted during the wait period;

wherein in store motion, the prior map is deleted during the wait period and the previous frame is maintained over the wait period; and wherein in store priors, the previous frame is deleted during the wait period and the prior map is maintained over the wait period.

8. The system as set forth in claim 7, wherein the processor is further configured to allow a user to selectively remove a sensor from the plurality of fixed sensors, leaving remaining sensors, which causes the system to adjust the memory management function by decreasing the wait period assigned to the remaining sensors.

9. The system as set forth in claim 8, wherein in receiving a series of consecutive frames, if the frames are in black and white, the frames are converted into an red/green/blue (rgb) format of three channels, an red-channel (r), a g-channel (g), and a b-channel (b), where all three channels have the same value.

10. The system as set forth in claim 9, wherein in splitting the current frame into four fully saturated channels, the channels are split as follows:

$$R = r - \frac{(g+b)}{2}, G = g - \frac{(r+b)}{2}, B = b - \frac{(r+g)}{2}, \text{ and}$$

$$Y = \frac{(r+g)}{2} - \frac{|r-g|}{2} - b.$$

11. The system as set forth in claim 10, wherein when generating a light intensity channel (L) and a dark intensity channel (D) from each frame, they are generated by averaging the r, g, and b-channels, as follows:

$$L=(r+g+b)/3$$

$$D=\text{(maximum value of a color channel)}-L.$$

12. The system as set forth in claim 11, wherein when generating five motion feature maps, the motion feature maps are generated based on motion across four cardinal directions and a glimmer.

13. The system as set forth in claim 12, wherein the system is configured to weight the surprise feature maps to modulate the system's surprise response to specific features.

14. A computer program product for identifying regions of interest in visual imagery, the computer program product comprising computer-readable instructions stored on a non-transitory computer-readable medium that are executable by a computer having a processor for causing the processor to perform operations of:

receiving a series of consecutive frames representing a scene as captured from N sensors, the frames having at least a current frame and a previous frame;

generating a surprise map based on features found in the current frame and the previous frame, the surprise map having a plurality of values corresponding to spatial locations within the scene; and determining a surprise in the scene based on a value in the surprise map exceeding a predetermined threshold wherein the processor uses a number B, less than N, of the N sensors to capture the series of consecutive frames, such that the B sensors are active during a burst period and are deactivated during a wait period during which at least one of the remaining sensors is active, and wherein the processor determines, for the B sensors, whether to store over the wait period at least one of a prior map and the previous frame.

15. The computer program product as set forth in claim 14, wherein the operation of generating the surprise map further comprises operations of:

splitting the current frame into four fully saturated color channels, an R-channel (R), a G-channel (G), a B-channel (B), and a Y-channel (Y);

generating a light intensity channel (L) and a dark intensity channel (D) from the current frame;

generating a series of color feature maps from the four color channels for the current frame using center-surround differencing between color channels, each color feature map representing a color feature;

generating a series of intensity feature maps from the two intensity channels for the current frame using center-surround differencing, each intensity feature map representing a color/intensity feature;

comparing the light intensity channel (L) from the current frame with an light intensity channel (L) from the previous frame to generate five motion feature maps, each motion feature map representing a motion feature;

generating a prior map (P) for each of the color and motion features by integrating the motion feature maps and the color feature maps over time;

updating the prior map as new current frames are received from the sensors;

generating a surprise feature map, for each feature, by determining a rectified difference between the feature map from the newest frame and its corresponding prior map;

generating a surprise color conspicuity map by combining and normalizing the RG and BY surprise feature maps;

generating an intensity surprise conspicuity map by normalizing the LD surprise feature map;

generating a motion surprise conspicuity map by combining and normalizing the five surprise feature maps for motion;

generating the surprise map by combining and normalizing the surprise conspicuity maps, the surprise map having a plurality of values corresponding to spatial locations within the scene.

16. The computer program product as set forth in claim 15, further comprising instructions to cause a processor to perform an operation of stabilizing the prior map through receiving new current frames and updating the prior map until a feature variance is less than a predetermined threshold.

17. The computer program product as set forth in claim 16, wherein in receiving a series of consecutive frames representing a scene as captured from N sensors, N is a plurality of fixed sensors and each sensor has a memory containing its own prior map (P) and the previous frame.

18. The computer program product as set forth in claim 17, further comprising instructions to cause a processor to perform an operation of memory management through selectively using a subset of the plurality of fixed the sensors to capture the series of consecutive frames.

19. The computer program product as set forth in claim 18, wherein in selectively using the subset, the subset of sensors is selected such that the subset is active and used during a burst period, and deactivated during a wait period.

20. The computer program product as set forth in claim 19, further comprising instructions to cause a processor to perform a memory management function selected from a group consisting of store all, store none, store motion, and store priors, as follows:

wherein in store all, the prior map (P) and the previous frame are maintained over the wait period;

wherein in store none, both the prior map and previous frame are deleted during the wait period;

wherein in store motion, the prior map is deleted during the wait period and the previous frame is maintained over the wait period; and wherein in store priors, the previous frame is deleted during the wait period and the prior map is maintained over the wait period.

21. The computer program product as set forth in claim 20, further comprising instructions to cause a processor to allow a user to selectively remove a sensor from the plurality of fixed sensors, leaving remaining sensors, which causes the processor to adjust the memory management function by decreasing the wait period assigned to the remaining sensors.

22. The computer program product as set forth in claim 21, wherein in receiving a series of consecutive frames, if the frames are in black and white, the frames are converted into an red/green/blue (rgb) format of three channels, an red-channel (r), a g-channel (g), and a b-channel (b), where all three channels have the same value.

23. The computer program product as set forth in claim 22, wherein in splitting the current frame into four fully saturated channels, the channels are split as follows:

$$R = r - \frac{(g+b)}{2}, G = g - \frac{(r+b)}{2}, B = b - \frac{(r+g)}{2}, \text{ and}$$

$$Y = \frac{(r+g)}{2} - \frac{|r-g|}{2} - b.$$

24. The computer program product as set forth in claim 23, wherein when generating a light intensity channel (L) and a dark intensity channel (D) from each frame, they are generated by averaging the r, g, and b-channels, as follows:

$L=(r+g+b)/3$ $D=$(maximum value of a color channel)$-L$.

25. The computer program product as set forth in claim 24, wherein when generating five motion feature maps, the motion feature maps are generated based on motion across four cardinal directions and a glimmer.

26. The computer program product as set forth in claim 25, further comprising instructions to cause a processor to weight the surprise feature maps to modulate the processor's surprise response to specific features.

27. A method for identifying regions of interest in visual imagery, the method comprising an act of:

causing a processor to execute instructions encoded on a memory, such that upon execution, the processor performs operations of:

receiving a series of consecutive frames representing a scene as captured from N sensors, the frames having at least a current frame and a previous frame;

generating a surprise map based on features found in the current frame and the previous frame, the surprise map having a plurality of values corresponding to spatial locations within the scene; and determining a surprise in the scene based on a value in the surprise map exceeding a predetermined threshold wherein the processor uses a number B, less than N, of the N sensors to capture the series of consecutive frames, such that the B sensors are active during a burst period and are deactivated during a wait period during which at least one of the remaining sensors is active, and wherein the processor determines, for the B sensors, whether to store over the wait period at least one of a prior map and the previous frame.

28. The method as set forth in claim 27, wherein the operation of generating the surprise map further comprises operations of:

splitting the current frame into four fully saturated color channels, an R-channel (R), a G-channel (G), a B-channel (B), and a Y-channel (Y);

generating a light intensity channel (L) and a dark intensity channel (D) from the current frame;

generating a series of color feature maps from the four color channels for the current frame using center-surround differencing between color channels, each color feature map representing a color feature;

generating a series of intensity feature maps from the two intensity channels for the current frame using center-surround differencing, each intensity feature map representing a color/intensity feature;

comparing the light intensity channel (L) from the current frame with an light intensity channel (L) from the previous frame to generate five motion feature maps, each motion feature map representing a motion feature;

generating a prior map (P) for each of the color and motion features by integrating the motion feature maps and the color feature maps over time;

updating the prior map as new current frames are received from the sensors;

generating a surprise feature map, for each feature, by determining a rectified difference between the feature map from the newest frame and its corresponding prior map;

generating a surprise color conspicuity map by combining and normalizing the RG and BY surprise feature maps;

generating an intensity surprise conspicuity map by normalizing the LD surprise feature map;

generating a motion surprise conspicuity map by combining and normalizing the five surprise feature maps for motion;

generating the surprise map by combining and normalizing the surprise conspicuity maps, the surprise map having a plurality of values corresponding to spatial locations within the scene.

29. The method as set forth in claim 28, further comprising an act of stabilizing the prior map through receiving new current frames and updating the prior map until a feature variance is less than a predetermined threshold.

30. The method as set forth in claim 29, wherein in receiving a series of consecutive frames representing a scene as captured from N sensors, N is a plurality of fixed sensors and each sensor has a memory containing its own prior map (P) and the previous frame.

31. The method as set forth in claim 30, further comprising an act of memory management through selectively using a subset of the plurality of fixed the sensors to capture the series of consecutive frames.

32. The method as set forth in claim 31, wherein in selectively using the subset, the subset of sensors is selected such that the subset is active and used during a burst period, and deactivated during a wait period.

33. The method as set forth in claim 32, further comprising an act of performing a memory management function selected from a group consisting of store all, store none, store motion, and store priors, as follows:

wherein in store all, the prior map (P) and the previous frame are maintained over the wait period;

wherein in store none, both the prior map and previous frame are deleted during the wait period;

wherein in store motion, the prior map is deleted during the wait period and the previous frame is maintained over the wait period; and wherein in store priors, the previous frame is deleted during the wait period and the prior map is maintained over the wait period.

34. The method as set forth in claim 33, further comprising an act of allowing a user to selectively remove a sensor from the plurality of fixed sensors, leaving remaining sensors, which causes the system to adjust the memory management function by decreasing the wait period assigned to the remaining sensors.

35. The method as set forth in claim 34, wherein in receiving a series of consecutive frames, if the frames are in black and white, the frames are converted into an red/green/blue (rgb) format of three channels, an red-channel (r), a g-channel (g), and a b-channel (b), where all three channels have the same value.

36. The method as set forth in claim 35, wherein in splitting the current frame into four fully saturated channels, the channels are split as follows:

$$R = r - \frac{(g+b)}{2}, G = g - \frac{(r+b)}{2}, B = b - \frac{(r+g)}{2}, \text{ and}$$

$$Y = \frac{(r+g)}{2} - \frac{|r-g|}{2} - b.$$

37. The method as set forth in claim 36, wherein when generating a light intensity channel (L) and a dark intensity channel (D) from each frame, they are generated by averaging the r, g, and b-channels, as follows:

$L=(r+g+b)/3$ $D=$(maximum value of a color channel)$-L$.

38. The method as set forth in claim 37, wherein when generating five motion feature maps, the motion feature maps are generated based on motion across four cardinal directions and a glimmer.

39. The method as set forth in claim 38, further comprising an act of weighting the surprise feature maps to modulate the system's surprise response to specific features.

* * * * *